US 007664246 B2

(12) United States Patent
Krantz et al.

(10) Patent No.: US 7,664,246 B2
(45) Date of Patent: Feb. 16, 2010

(54) SORTING SPEAKERS IN A NETWORK-ENABLED CONFERENCE

(75) Inventors: Anton W. Krantz, Kirkland, WA (US);
Dalibor Kukoleca, Redmond, WA (US);
Wei Zhong, Issaquah, WA (US);
Guo-Wei Shieh, Sammamish, WA (US);
Zong Zong Yuan, Bellevue, WA (US);
Tim M Moore, Bellevue, WA (US);
Danny Levin, Redmond, WA (US);
Michael R VanBuskirk, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 759 days.

(21) Appl. No.: 11/275,559

(22) Filed: Jan. 13, 2006

(65) Prior Publication Data
US 2007/0165820 A1    Jul. 19, 2007

(51) Int. Cl.
*H04M 3/42* (2006.01)

(52) U.S. Cl. .............................. 379/202.01; 348/14.09; 370/260

(58) Field of Classification Search ............ 379/202.01; 348/14.01–14.09
See application file for complete search history.

(56) References Cited

U.S. PATENT DOCUMENTS

| 6,346,963 B1* | 2/2002 | Katsumi ............... 348/14.09 |
| 6,457,043 B1* | 9/2002 | Kwak et al. ............. 709/204 |
| 6,466,550 B1 | 10/2002 | Foster et al. |
| 6,577,333 B2* | 6/2003 | Tai et al. ............... 348/14.08 |
| 6,934,756 B2 | 8/2005 | Maes |
| 2001/0055279 A1 | 12/2001 | Abe |
| 2002/0181686 A1* | 12/2002 | Howard et al. ......... 379/202.01 |
| 2002/0193991 A1 | 12/2002 | Bennett et al. |
| 2005/0180341 A1* | 8/2005 | Nelson et al. ............ 370/260 |
| 2007/0291667 A1* | 12/2007 | Huber et al. ............ 370/260 |

* cited by examiner

*Primary Examiner*—Curtis Kuntz
*Assistant Examiner*—Maria El-Zoobi
(74) *Attorney, Agent, or Firm*—Lee & Hayes, PLLC (57) ABSTRACT

Systems, methods, and/or techniques ("tools") are described that sort speakers in a network-enabled conference. In some cases, this sorted list of speakers indicates which speaker is dominant. With this sorted list, a participant's communication device may provide context about the speakers. In some cases a participant's communication device has a display that presents real-time video of the speakers or other visual indicia, such as each or the most dominant speaker's name, picture, title, or location. These and other context about speakers may help participants better understand discussions in network-enabled conferences.

20 Claims, 8 Drawing Sheets

SORTING SPEAKERS IN A NETWORK-ENABLED CONFERENCE

BACKGROUND

Currently, many people communicate remotely through network-enabled conferences. Network-enabled conferences allow people to interact in groups without having to travel. But these remote conferences may be confusing because they provide less context than in-person meetings. A conference participant in London, for instance, may not know who is speaking— the company's chief technologist in Boston or a vendor from New York. And it can be even more confusing when multiple participants are speaking at once.

SUMMARY

Systems, methods, and/or techniques ("tools") are described that sort speakers in a network-enabled conference. In some cases, this sorted list of speakers indicates which speaker is dominant. With this sorted list, a participant's communication device may provide context about the speakers. In some cases a participant's communication device has a display that presents real-time video of the speakers or other visual indicia, such as each or the most dominant speaker's name, picture, title, or location. These and other context about speakers may help participants better understand discussions in network-enabled conferences.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The same numbers are used throughout the disclosure and figures to reference like components and features.

DETAILED DESCRIPTION

Overview

The following document describes tools capable of sorting speakers in a network-enabled conference. When more than one participant is or has recently been speaking, the tools may sort between the participants based on their speaking history and other factors. The tools may provide this sorted list to a participant so that the participant may gain context about participants that are or have recently been speaking. In some cases, the tools also indicate which of the participants is the dominant speaker.

An environment in which the tools may enable these and other techniques is set forth first below in a section entitled Exemplary Operating Environment. This section is followed by another section describing exemplary manners in which elements of the exemplary operating environment may operate, entitled Exemplary Dominant Speaker Determination. Another section describing ways in which the tools may sort speaking participants in a network-enabled conference follows, entitled Sorting Processes. A final section, entitled Exemplary Algorithm, sets forth an exemplary algorithm by which a sorting speaker module may select a dominant speaker.

Exemplary Operating Environment

Before describing the tools in detail, the following discussion of an exemplary operating environment is provided to assist the reader in understanding some ways in which various inventive aspects of the tools may be employed. The environment described below constitutes but one example and is not intended to limit application of the tools to any one particular operating environment. Other environments may be used without departing from the spirit and scope of the claimed subject matter.

Figure 1:
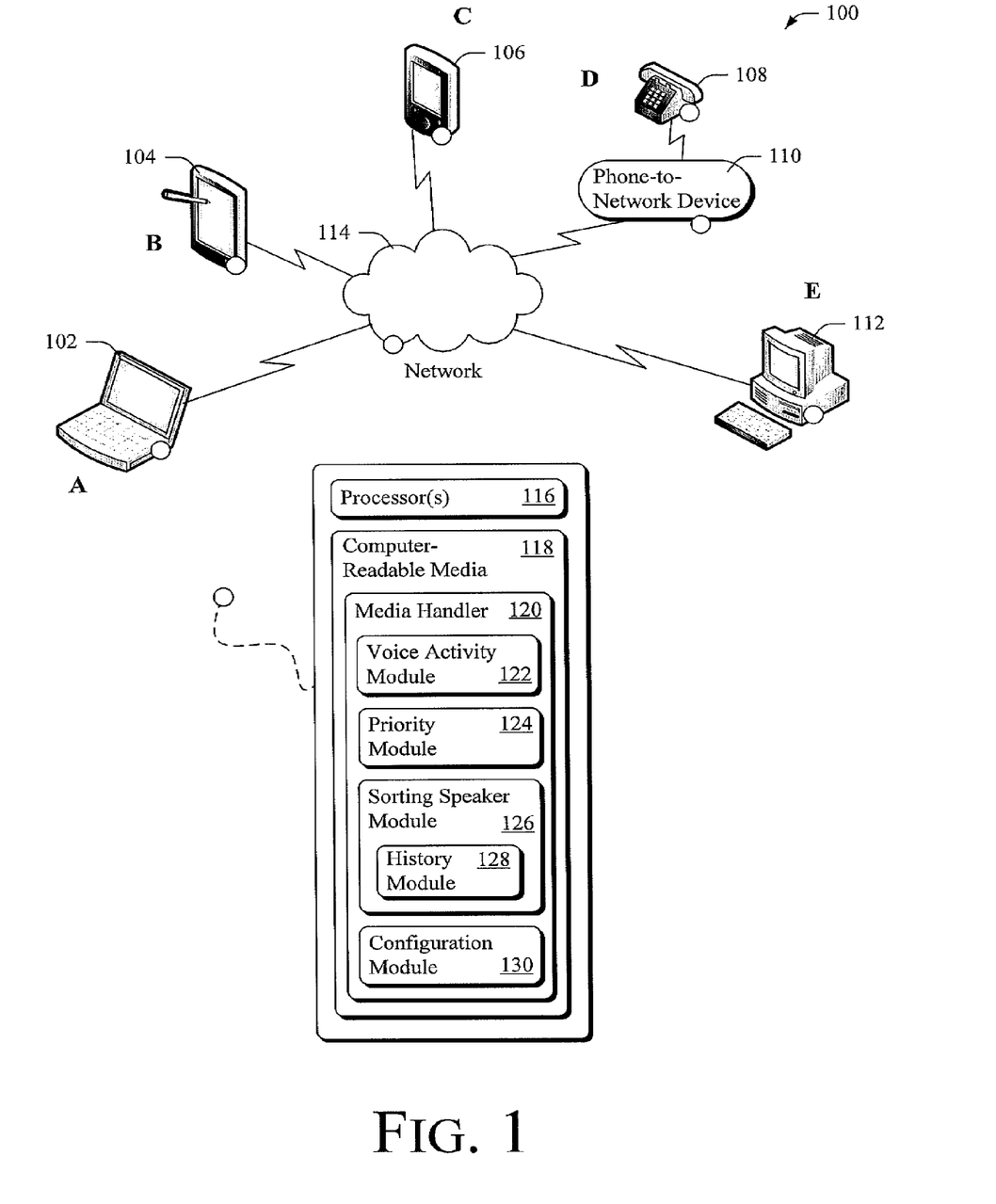
FIG. 1 illustrates an exemplary operating environment in which various embodiments of the tools may operate.

FIG. 1 illustrates one such operating environment generally at 100 having five conference participants, participant A shown commnunicating with a communication device 102, participant B shown communicating with a communication device 104, participant C shown communicating with a communication device 106, participant D shown communicating with a telephone 108 connected to a phone-to-network communication device 110, and participant E shown communicating with a communication device 112. A participant may, in some cases, contain multiple persons—such as when two people are speaking on telephone 108 either over a speaker phone or a telephone-network-enabled conference call.

The environment also has a communications network 114, such as a company intranet or a global internet (e.g., the Internet). The participants' devices may be capable of communicating directly to the network (e.g., a wireless-Internet enabled laptop, PDA, or a Tablet PC, or a desktop computing device or VoIP-enabled telephone or cellular phone wired or wirelessly connected to the Internet) or indirectly (e.g., the telephone connected to the phone-to-network device). The conference may be enabled through a distributed or central network topology (or a combination of these). Exemplary distributed and central network topologies are illustrated as part of an example described below.

The communication network and/or any of these devices, including the phone and the phone-to-network device, may be a computing device having one or more processor(s) 116 and computer-readable media 118 (each device marked with "O" to indicate this possibility). The computer-readable media comprises a media handler 120 having one or more of a voice activity module 122, a priority module 124, a sorting speaker module 126 having or having access to a history module 128, and a configuration module 130. The processor(s) are capable of accessing and/or executing the computer-readable media. The media handler is capable of receiving one or more audio streams from participants and outputting an indication that one of the participants is the dominant speaker. The media handler is shown as one cohesive unit, though portions of it may be disparately placed, such as some modules residing in network 114 and some residing in one of the other devices.

Each of the participants may contribute and receive audio streams and, in some cases, video streams. The voice activity module is capable of determining whether contributed audio is likely a participant's speech or not. Thus, if participant A coughs (which contributes audio to the conference), the voice activity module may determine that the cough is not speech. It may do so, for instance, by measuring the intensity and duration of the audio in the stream.

The priority module is capable of setting a weighting factor for various audio streams, such as setting a presenter's audio stream as more important than some other participant's audio stream. The priority module is also capable of assigning priorities to participants based on static and dynamic properties, which will be discussed in greater detail below.

The sorting speaker module is capable of sorting speakers and/or determining that a particular speaker in a network-enabled conference is the dominant speaker. For example, the sorting speaker module may determine, at a particular point in time, that one speaking participant is more dominant than two other speaking participants based on a moving average of their audio streams that contain speech. In doing so, the sorting speaker module may use the history module. The history module is capable of maintaining a history of audio streams. The history module may also, in some cases, assign a higher weight or importance to audio packets (packets are discrete portions of the stream) based on a moving average, such as by assigning a higher weight to packets that are received more recently than others. The history module may also dynamically vary how often the sorting speaker module determines which participant is the dominant speaker.

The configuration module comprises settings, such as intervals at which speakers are sorted or a dominant speaker is determined and time periods of speech history used. These may be set by default or received either prior to or during a conference.

Exemplary Dominant Speaker Determination

The following discussion describes exemplary ways in which the tools determine which participant in an Internet-enabled conference is the dominant speaker. This discussion uses elements of operating environment 100 of FIG. 1, though other elements or other environments may also be used.

Media handler 120 receives audio streams from participants in an Internet-enabled conference call and outputs an indication of which of these participants is the dominant speaker. The conference call may be enabled with a central, distributed, or combined central-distributed communication topology. Example central and distributed topologies are described below.

Figure 2:
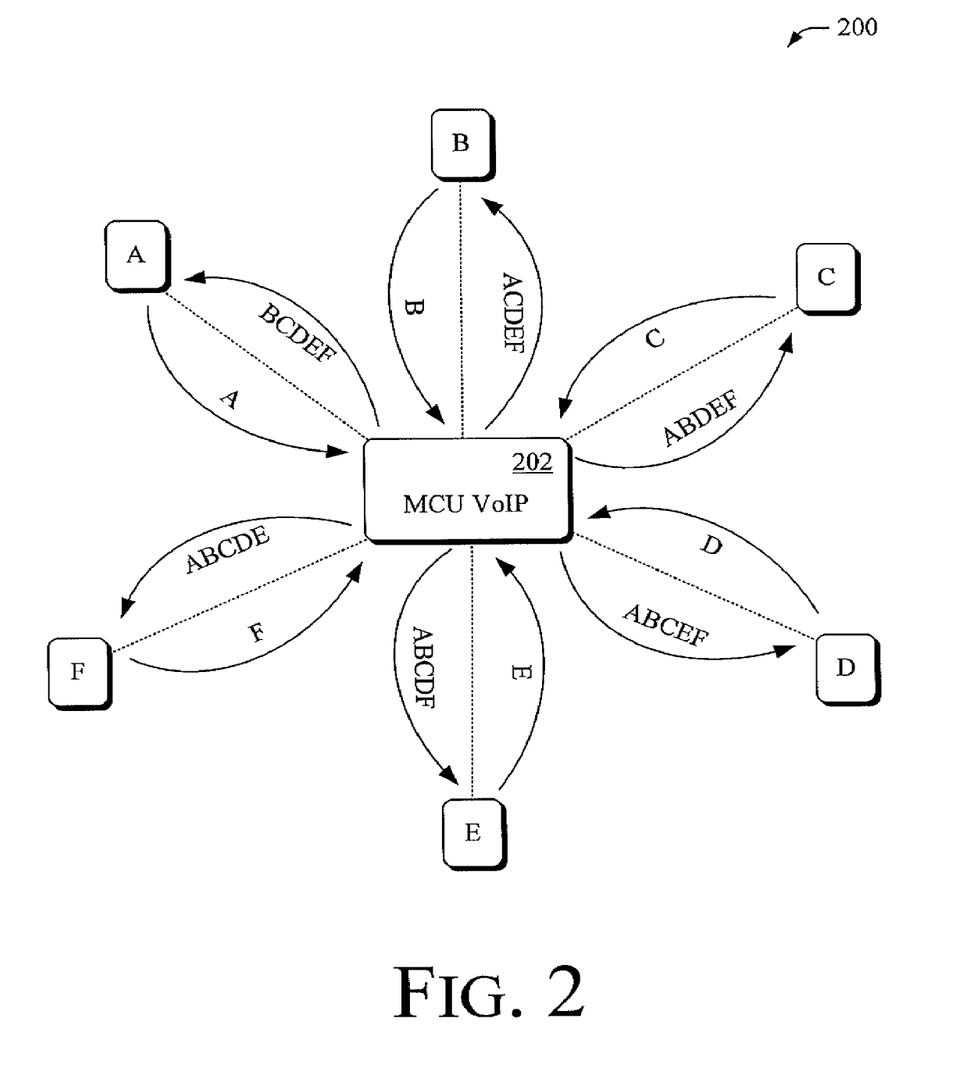
FIG. 2 illustrates an exemplary central communication topology.

FIG. 2 illustrates an exemplary central communication topology 200. Here a media stream is passed from each participant A through F to an audio-video or audio-only MCU (Multipoint Control Unit) VoIP (Voice over Internet Protocol) server(s) 202. This server passes one or more media streams to each participant. The server may select to send a single media stream that is only one or a combination of some of the media streams received by the server. In this exemplary central communication topology, media handler 120 is executed by server 202.

Figure 3:
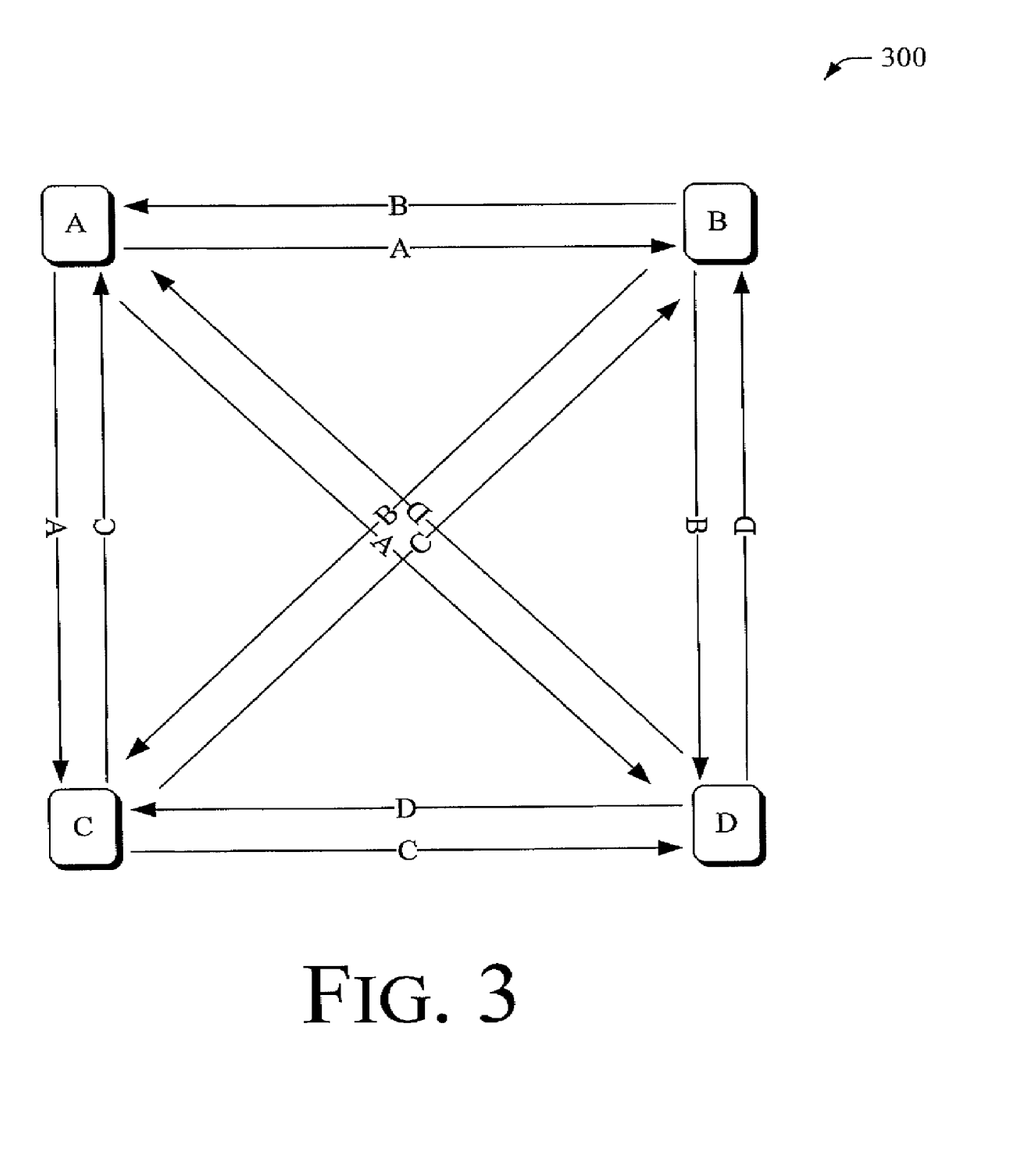
FIG. 3 illustrates an exemplary distributed communication topology.

FIG. 3 illustrates an exemplary distributed communication topology 300. Here media streams are passed from each participant A through D to each other participant through the Internet, either directly or through Network Address Translators (NATs) or media relays or a combination thereof. Participants A through D may be chatting online, for instance. Participant B, for example, passes his or her media stream (audio and in some cases video) to each participant A, C, and D. In this distributed topology, media handler 120 is executed by a computing device of a participant (e.g., a participant's laptop).

In either of these topologies or a combined topology, media handler 120 receives audio streams from conference participants and indicates which is the dominant speaker. In a central communication topology, a media stack of the MCU VoIP server(s) 202 generate an event indicating a participant's dominant speaker status using a conference-information document propagated to the conference participants. In a distributed communication topology, each participant's communication device (if capable) generates an event indicating a participant's dominant speaker status. For ease in explanation, the following examples cover three participants, though many more may be handled.

Figure 4:
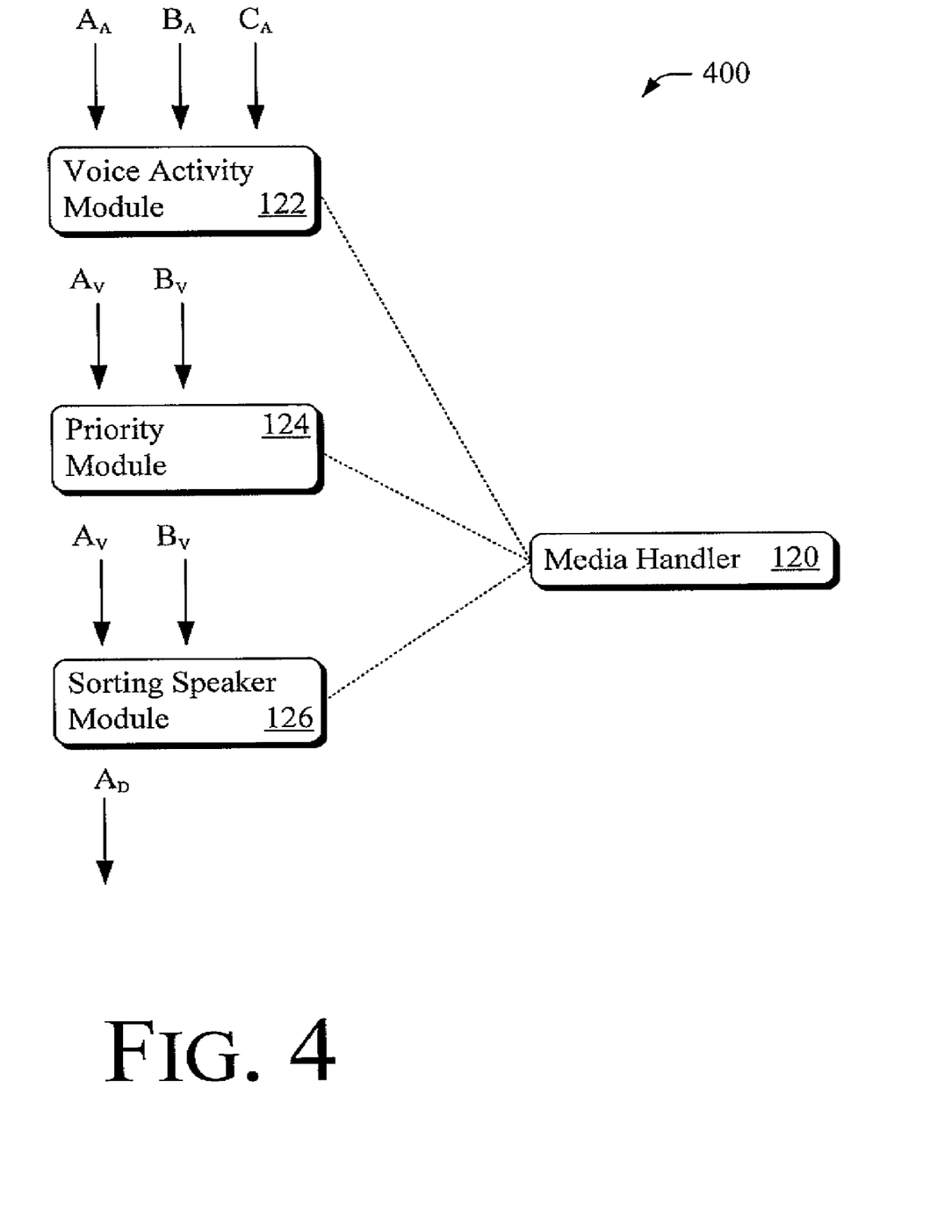
FIG. 4 shows an exemplary flow diagram of audio streams, and modules described in FIG. 1.

Assume that there are three conference participants A, B, and C using devices 102, 104, and 106 of FIG. 1, respectively. The media handler receives (in any of the above topologies) an audio stream "$A_A$" from participant A, an audio stream "$B_A$" from participant B, and an audio stream "$C_A$" from participant C. This is illustrated in FIG. 4, which shows a flow diagram of modules 122, 124, and 126 of FIG. 1. These modules are parts of media handler 120 (shown with dashed lines), though they may be discrete or simply represent portions of the media handler that perform particular actions.

Voice activity module 122 receives the audio streams in the form of packets; each packet received at a particular period, here every 20 milliseconds or as each packet is received. The voice activity module determines that the audio streams from A and B are voice and that the audio stream from C is not (e.g., it is background noise, a cough, or a sneeze). The voice activity module outputs two active speakers—two media streams that are determined to contain speech by participants A and B. These are shown at "$A_V$" and "$B_V$" in FIG. 4 and also over time from T=0s to T=2s in FIG. 5 as horizontal lines from "A" and "B" between vertical lines at T=0s and T=2s in an exemplary speech/time graph 500. Note that B was not talking from T=0s to T=1s and for about 200 ms between T=1s and T=2s.

Figure 5:
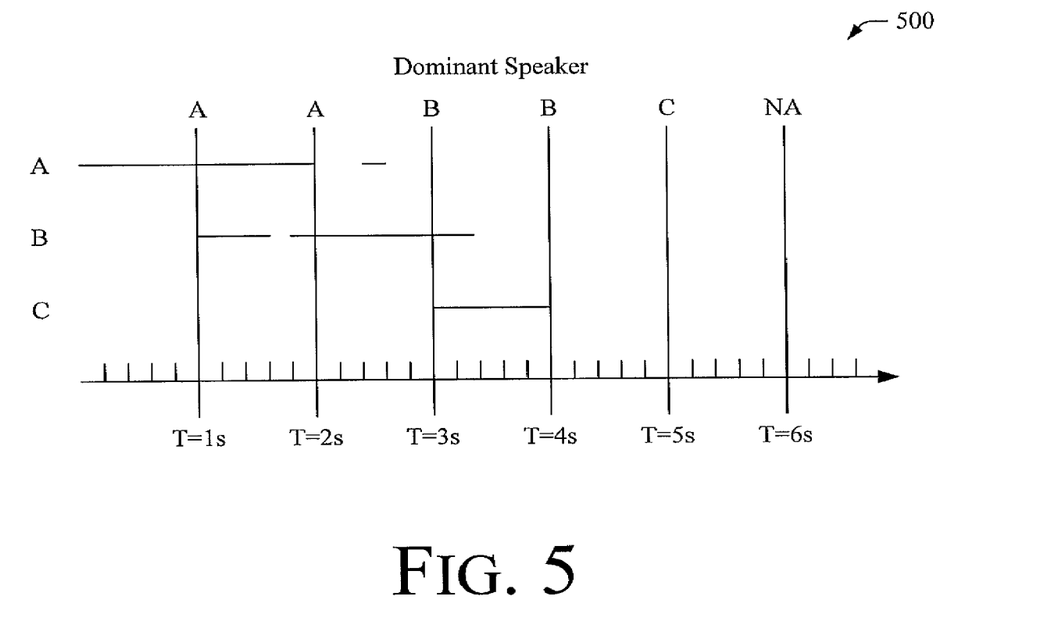
FIG. 5 illustrates a first exemplary speech/time graph.

Basically, A and B were talking for at least part of the last two seconds and C was not. The voice activity module may pass all of the audio streams on and indicate which represent speech or pass only those that it determines to be speech. Here we assume the later (only speech streams are shown in FIG. 5). The voice activity module may also balance the intensity or gain on audio streams, such as when one participant is nearer to his microphone than another is to his.

Priority module 124 receives active speaker streams (or indications of the is same) and may alter their relative importance. In some cases, either by default or on receiving information about a participant, some participants are deemed more important than others. If A were to have a weighting factor of 2, for instance, his speech would be twice as important as the other participants' speech. Weighting may be received as a parameter configured using an Application Program Interface (API). Here the participants do not have a weighting factor.

The priority module may also act to set a participant's priority for the purpose of breaking a tie.

Sorting speaker module 126 receives active speaker audio streams, which here have no weighting information and no priority. The sorting speaker module determines which speaker is dominant based on their history of active speech. This history can be of a certain period, even as little as one packet, or as much as many seconds. The history is stored in history module 128. Here the period of speech used is two seconds. The sorting speaker module determines that A is dominant at T=1s as only A has been talking during the last two-second period (which here has only one second of history).

It also determines which is dominant at certain intervals, here every second (starting at T=1s). One second is chosen as an interval because human speech often lasts a second or longer. Often participants in a conference will interject meaningful speech lasting about a second or more—such as answering "yes" or "no" to another participant's question. Audio in a stream lasting less than one second is often not meaningful in a conference. A history of about two or more seconds aids in the dominant speaker not being switched too often. A history of considerably more than two seconds (e.g., 30 seconds) would cause the switching to be too infrequent to be useful to participants. If the dominant speaker is switched too often, such as about half a second or less, participants in a conference may have difficulty tracking which participant is speaking or correlating this context with the speech being heard. In some cases dominance is a measure of which speaker is more active over a particular period. In some other cases dominance is based on this and other factors, such as the importance of the speaker.

At T=2s the sorting speaker module determines that participant A is the dominant speaker based on participant A having spoken more than participant B over the last two seconds. If B had a weighting factor of 2, however, A would need to be speaking at least twice as much as B. The module indicates that A is the dominant speaker, shown at "$A_D$" in FIG. 4, and in FIG. 5 with an "A" over a vertical line above "T=2s" (two seconds).

Note that at three seconds, participant B will have spoken more than participant A over the preceding 2 seconds and will be indicated as the dominant speaker, as well as at four seconds. At T=3s, B will have spoken for almost all of the last two seconds. At T=4s, B will have spoken more that participant C. At T=5s, C will have spoken much more than B. Note that C will be the dominant speaker at T=5s even though C is not currently speaking. In some cases a dominant speaker is not speaking at the interval in which the dominant speaker is determined. This may also be the case even if other participants are speaking at the interval. At T=6s, the sorting speaker module may indicate that no speaker is dominant, as no one has spoken for the last second. The sorting speaker module may also make no indication, thereby permitting C to remain the dominant speaker at T=6s.

To help the reader understand some of the many ways in which the tools may determine that a speaker is dominant, other examples showing different speaker scenarios are given below.

Figure 6:
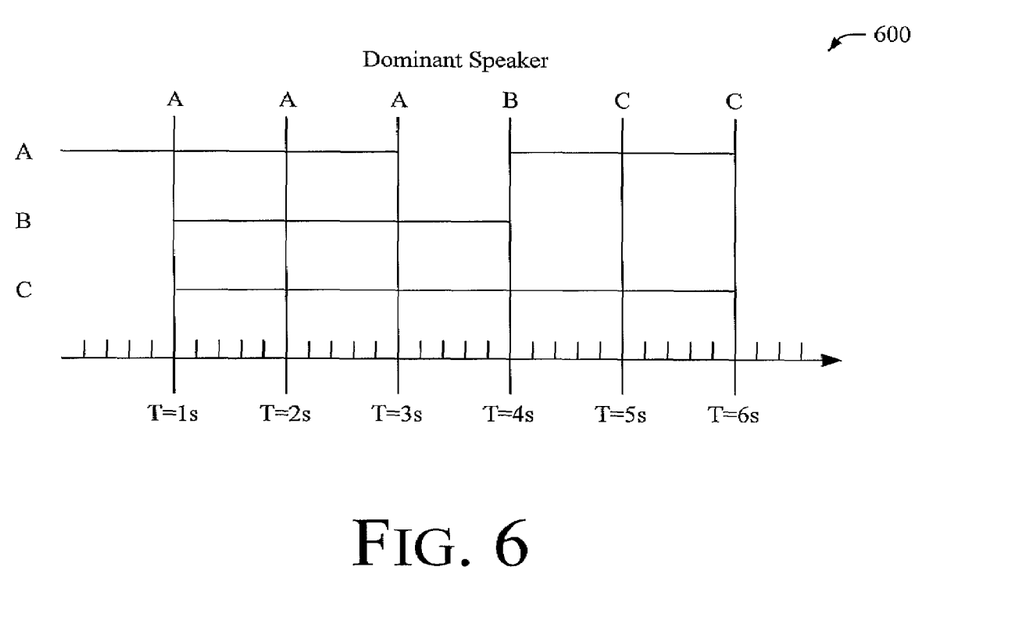
FIG. 6 illustrates a second exemplary speech/time graph.

FIG. 6, for example, sets forth another exemplary speech/time graph 600. Assume here that no weighting factor is given and that a priority is given when there is a tie to a participant that has not yet been indicated as the dominant speaker.

At T=0s through 1s, the voice activity module determines every 20 milliseconds (fifty times from T=0 to T=1), that participant A is speaking. This is shown with the solid line from participant A up to T=1s. The priority module does not indicate a priority at this point. The sorting speaker module retains this history in its history module, determines that only A has spoken (shown with an "A" over a vertical line above "T=1s"), and indicates that A is the dominant speaker.

From T=1s to T=2s, the voice activity module determines that all three participants are speaking. This is shown with the three solid lines from A, B, and C between T=1s and T=2s. The sorting speaker module determines that A is still the dominant speaker (which does not need to be actively indicated by the sorting speaker module if the receivers of the prior indication retain the prior dominant speaker).

From T=2s to T=3s, the voice activity module determines that all three participants have been speaking. This is shown with the three solid lines from A, B, and C between T=2s and T=3s. The sorting speaker module determines that all three participants have been actively speaking for that same amount of time, i.e., all of the last two seconds. With this tie, the sorting speaker module may arbitrarily choose a dominant speaker, choose based on which speaker joined the conference first, or choose based on which of the speakers was speaking before there was a tie. Here the sorting speaker module chooses based which speaker was speaking before there was a tie, and so selects A as the dominant speaker. The sorting speaker module indicates to the priority module that A has been selected. Thus, the sorting speaker module may select between tied speakers based first on whether one was the immediately previous dominant speaker. It may then select the first person to join the conference if none of the speakers were the immediately previous dominant speaker and none previously were dominant speakers. Following these it may clear a dominant speaker flags and go through the above steps over again.

From T=3s to T=4s, the voice activity module determines that participants B and C spoke for all of the last second. Based on this and the history of B and C speaking from T=2s and T=3s, the sorting speaker module determines that it is a tie and selects B based on B joining the conference before C and indicates this selection for B to the priority module. The sorting speaker module indicates that B is the dominant speaker.

From T=4s to T=5s, the voice activity module determines that participants A and C spoke for all of the last second. Based on this and the history of C speaking from T=3s and T=4s and A not speaking, the sorting speaker module determines and indicates that C is the dominant speaker.

From T=5s to T-6s, the voice activity module determines that participants A and C spoke for all of the last second. Based on this and the history of A and C speaking from T=4s and T=5s, the sorting speaker module determines that it is a tie. The sorting speaker module determines that C is dominant because C was dominant at T=4s.

In each of these cases the media handler may output an indication of which participant is the dominant speaker with an event using an API. This indication is may be received by devices used by the participants. Based on this indication the devices may provide context about the dominant speaker, such as a live video feed from that participant, which the device may highlight, expand, or shown as dominant, or a picture, title, or location for the dominant speaker.

Sorting Processes

The following discussion describes various ways in which the tools sort speaking participants in a network-enabled conference.

Figure 7:
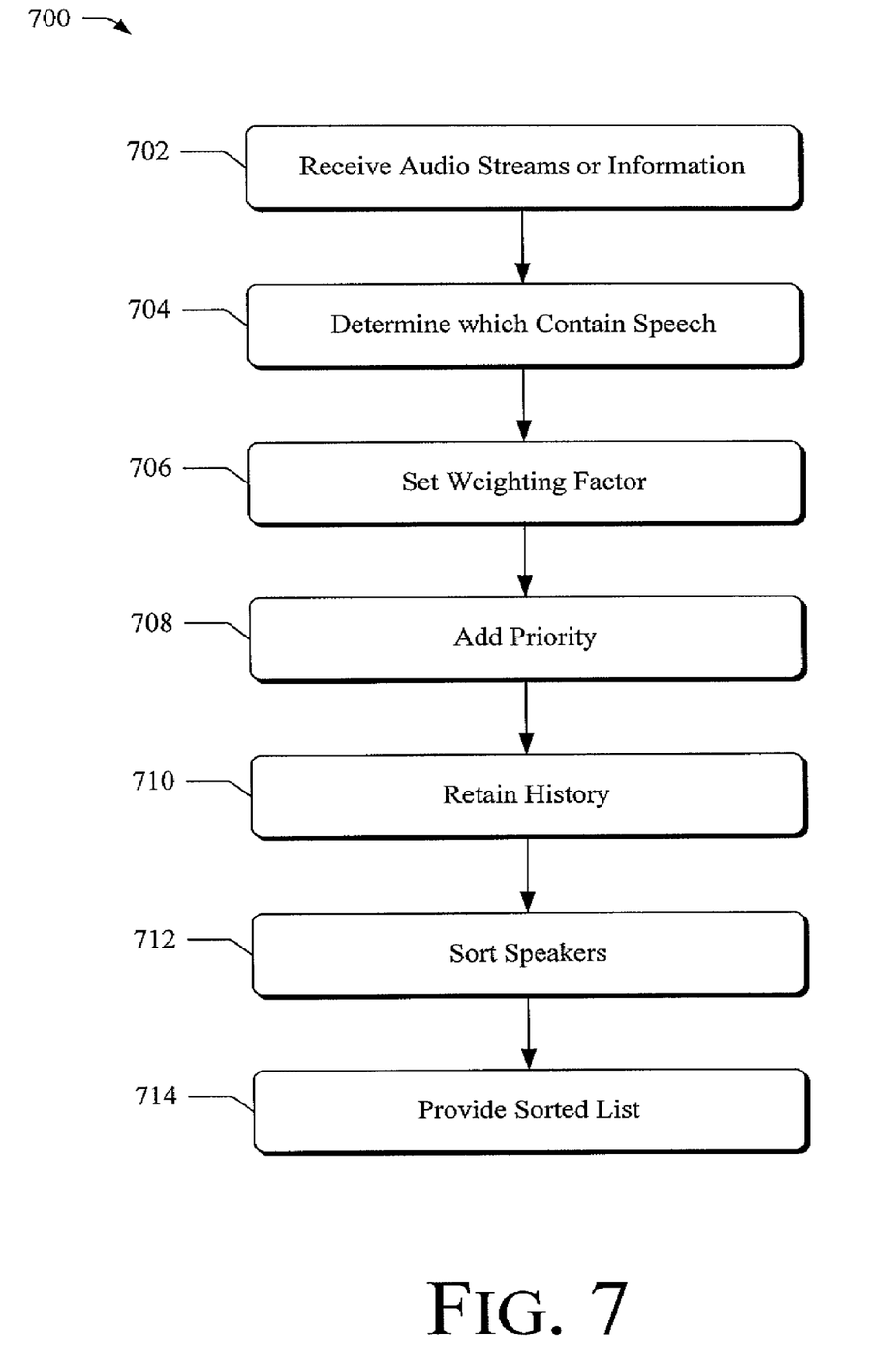
FIG. 7 is an exemplary process describing various ways in which the tools may sort and/or select a dominant speaker in a network-enabled conference.

FIG. 7 is one such exemplary process 700. It is illustrated as a series of blocks representing individual operations or acts performed by elements of operating environment 100 of FIG. 1, such as media handler 120 and sorting speaker module 126. This and other processes disclosed herein may be implemented in any suitable hardware, software, firmware, or combination thereof, in the case of software and firmware, these processes represent a set of operations implemented as computer-executable instructions stored in computer-readable media and executable by one or more processors.

Block 702 receives audio streams from three or more participants of a network-enabled conference or information about the audio streams. These audio streams may comprise packets received in real time, such as an audio stream of two seconds having ten packets, each packet representing 20 milliseconds of audio received from a conference participant. Information about the audio streams may also or instead be received, such as in or comprising a CSRC (Contributing SouRCe) or out-of-band signaling mechanism. These audio streams or information may be received by media handler 120 executed by a central server in a centralized communication topology or executed by a participant's is communication device in a distributed communication topology. Examples of these scenarios are described above.

Block 704 determines which of the audio streams contain speech, either by analyzing the audio streams themselves or the information about the audio streams. In one example above, voice activity module 122 determines which audio streams or parts thereof is speech and which are not. The voice activity module may determine that certain parts of a participant's audio stream are not speech and other parts are. This may be effective to exclude some packets of a participant's audio stream from being determined to be speech, thereby reducing the possibility that that participant will be the highest-sorted (i.e., dominant) speaker.

Block 706 may build a weighting factor into the audio streams determined to contain speech or information about them. This weighting factor may represent a selection by one or more participants or a default setting, such as to make a participant that is the conference presenter or first-joiner to be given more weight than another participant. Block 706 may act before, after, or concurrently with blocks 702 and/or 704. In the examples described above, priority module 124 has or receives weighting factors and applies these to audio streams determined to contain speech.

Block 708 may add a priority to audio streams or to participants associated with those audio streams, the priority usable to decide between participants that would otherwise tie for dominant speaker or a later position in the sorted list. As set forth in examples above, priority module 124 may break ties between participants based on various factors.

Block 710 retains a history of the audio streams. This history may be retained in history module 128 as set forth above and may be based on receiving one or more packets of speech in the audio streams (e.g., 100 packets received over about two seconds) or information about the audio streams. Also, the history module may contain sufficient history about the audio streams (e.g., that the audio streams were determined to contain speech for some number of packets) and their associated participants to enable sorting speaker module 126 to dynamically alter how it sorts or determines dominance.

Block 712 sorts the audio streams based on a history of the audio streams having been determined to contain speech or the information about the audio streams. Block 712 may do so based on information just received or a single packet for each audio stream. Block 712 may also determine which audio stream and/or it associated participant is dominant. Block 712 may sort at particular intervals and based on particular periods of history from configuration module 130, though these intervals and periods may change over time.

For example, sorting speaker module 126 may sort the speaking participants at one-second intervals based on speech activity over the preceding two seconds (i.e., with two-second periods), as set forth in the examples above that describe a determination of a dominant speaker. These intervals and periods may be received from configuration module 130 and may be set by default or otherwise. The sorting speaker module may receive other intervals and periods, including those based on longer, ongoing history of speech. For example, the configuration module may increase the interval to three seconds if one participant has been speaking without interruption for longer than a specified or pre-determined period (e.g., for eight minutes). Or the media handler may determine, based on its performance or that of the computing device on which the media handler or sorting speaker module is executing, to reduce or increase the interval and thus alter the settings in the configuration module. The media handler may increase the interval on a cell phone with limited computing resources to four seconds and the period to four, six, or eight seconds, for example.

In one case block 712 performs an algorithm to sort the speaking participants effective to determine dominance. This is described later and illustrated in FIG. 8.

Block 714 provides the sorted list of speaking participants to one or more participants of the network-enabled conference. This sorted list may be provided with events and using an API. In a distributed communication topology, an event may be used locally to denote context. In a central communication topology a server may distribute notification of an event to the remote participants without relying on CSRCs. MCU VoIP servers 202, for example, may provide the sorted list to telephone 108 (which may not be able to receive CSRCs). The telephone may then indicate to participant D what is in this sorted list (e.g., which participant is dominant).

Responsive to this indication, a participant's communication device may show speaker status (e.g., dominant, second, third) in various manners described above. The context provided to participants may help participants better understand discussions in network-enabled conferences.

Exemplary Algorithm

Figure 8:
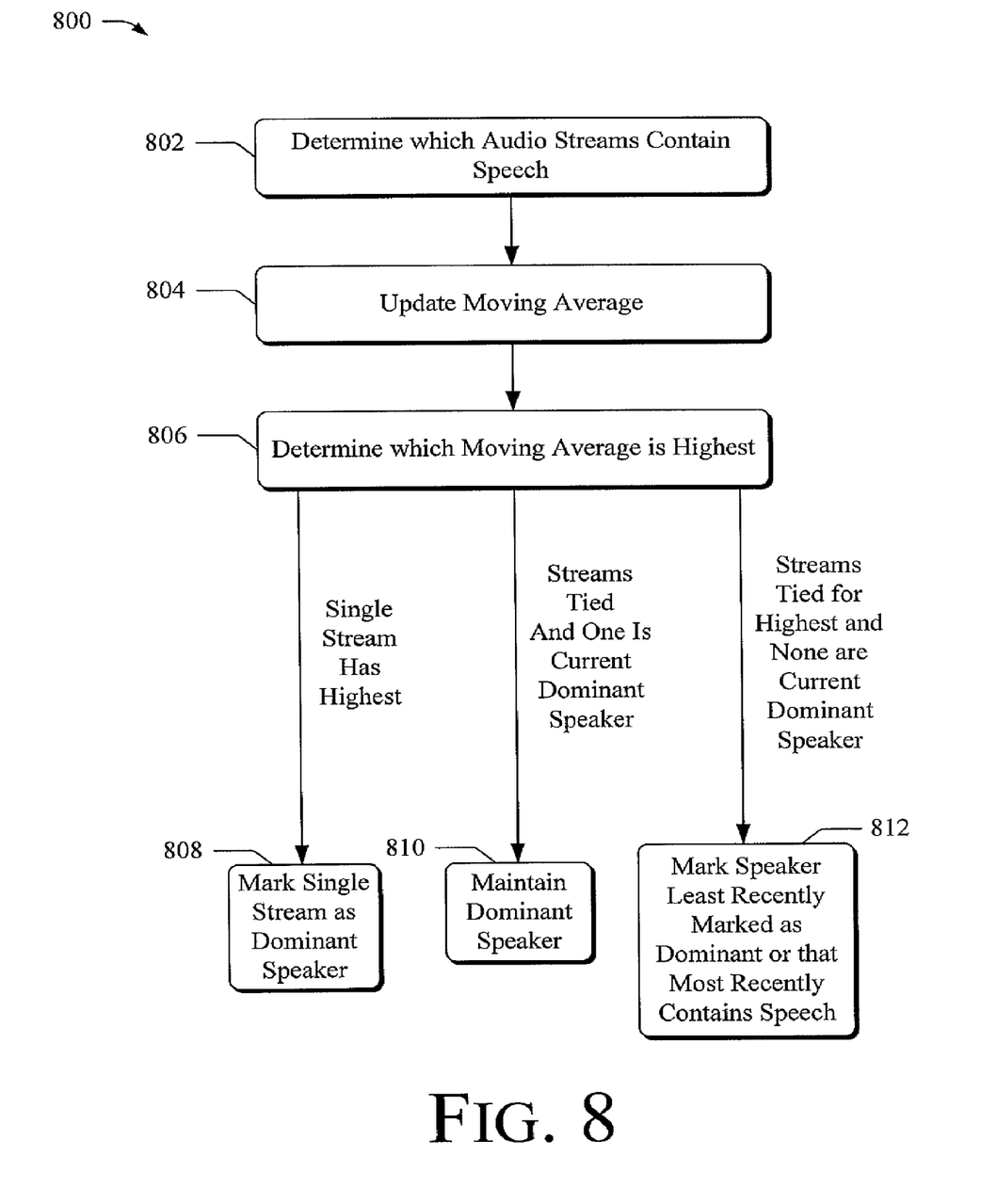
FIG. 8 sets forth an exemplary algorithm for determining a dominant speaker in a network-enabled conference.

FIG. 8 is an exemplary algorithm 800 for determining a dominant speaker in a network-enabled conference. It is illustrated as a series of blocks representing individual operations or acts performed by elements of operating environment 100 of FIG. 1, such as voice activity module 122, sorting speaker module 126, and history module 128. This process may act in conjunction with or separate from other processes described herein.

Block 802 determines, at a particular interval, which audio streams for participants in a conference contain speech. Block 804 updates a moving average of speech activity for each participant in the conference based on the amount of each audio stream over time that contains speech.

Block 806 determines which audio stream has the highest moving average of speech. A moving average may be based on a participant's history of speech over a particular period and a weight given that speech. The participant's moving average, for instance, may be computed with a running sum (e.g., of packets that contain speech), an average over a period, or other statistical weightings usable to compute a value for an amount of speech. If a single stream has the highest moving average, block 808 marks this stream as the dominant speaker. If two or more streams have the same highest moving average of speech, block 810 maintains the current dominant speaker.

If two or more speakers are tied and none are the current dominant speaker, block 812 marks the stream that has least-recently been marked as the dominant speaker and/or that more recently contains speech. In the first case, if two or more streams have not been marked as the dominant speaker, block 812 marks the stream as dominant that joined the conference first. In the second case, if two of the speech streams have a same highest moving average and only one of the speech streams currently contains speech at the interval, the block 812 marks the speech stream that currently contains speech as the dominant speaker. is In any of these cases, the algorithm retains a history of which stream has been indicated as the dominant speaker and optionally when it was chosen. This permits future ties between streams to be handled based on the above algorithm.

CONCLUSION

The above-described systems, methods, and/or techniques enable sorting of speakers in a network-enabled conference, including which of the speakers is dominant. With this sorted list, a participant's communication device may provide context about the speakers. This context may help participants better understand discussion in network-enabled conferences. Although the systems, methods, and techniques have been described in language specific to structural features and/or methodological acts, it is to be understood that these are defined in the appended claims are not necessarily limited to the specific features or acts described. Rather, the specific features and acts are disclosed as exemplary forms of implementing the claimed systems, methods, and techniques.

The invention claimed is:

1. A method implemented at least in part by a computing device comprising:
   receiving audio streams determined to contain speech from participants in a network-enabled conference having three or more participants or information about the audio streams determined to contain speech;
   determining which of one or more audio steams in the network-enabled conference contains speech, and using the determined audio streams to provide speech streams;
   updating a moving average of the speech streams, the moving average based at least in part on an amount of speech in each speech stream over a period of time;
   determining which of the speech streams has a highest moving average; if only one of the speech streams has the highest moving average, marking that speech stream as the dominant speaker;
   if two of the speech streams have a same highest moving average and only one of the speech streams currently contains speech, marking the speech stream that currently contains speech as the dominant speaker; and
   if two of the speech streams have a same highest moving average and if more than one of the speech streams recently contains speech, then marking the least-recently marked speech stream as the dominant speaker;
   sorting the audio streams based on a history of the audio streams having been determined to contain speech or the information about the audio streams; and
   indicating to a participant of the network-enabled conference that the marked speech stream is the dominant speaker, and enabling context associated with the dominant speaker to be provided to the participant.

2. The method of claim 1, wherein the act of receiving receives audio streams determined to contain speech and the act of sorting is based on the history of the audio streams having been determined to contain speech.

3. The method of claim 1, wherein the act of receiving receives the history of the information about the audio streams determined to contain speech and the act of sorting is based on the history of the information about the audio streams determined to contain speech.

4. The method of claim 3, wherein the information about the audio streams determined to contain speech comprises a CSRC (Contributing SouRCe).

5. The method of claim 1, further comprising receiving audio streams not yet determined to contain speech and determining that the audio streams contain speech.

6. The method of claim 1, further comprising determining that one of the participants is the dominant speaker based on the act of sorting.

7. The method of claim 6, further comprising indicating which of the participants is the dominant speaker.

8. The method of claim 7, wherein the act of indicating comprises directing communication devices used by the participants to provide visual indicia indicating which participant is the dominant speaker.

9. The method of claim 8, wherein the act of receiving comprises receiving packets containing portions of audio streams determined to contain speech, the history comprises about two or more seconds of received packets, and the act of determining is performed repeatedly about every one half to one and a half seconds.

10. The method of claim 1, wherein the act of determining is further based on an importance of the participants from which audio streams determined to contain speech are received.

11. A computer-readable medium having computer-readable instructions therein that, when executed by a computing device, cause the computing device to perform acts comprising:
   determining which of one or more audio steams in a network-enabled conference having three or more participants contain speech to provide speech streams;
   updating a moving average of the speech streams, the moving average based at least in part on an amount of speech in each speech stream over a period of time;
   determining which of the speech streams has a highest moving average;
   if only one of the speech streams has the highest moving average, marking that speech stream as the dominant speaker; or
   if two of the speech streams have a same highest moving average and only one of the speech streams currently contains speech, marking the speech stream that currently contains speech as the dominant speaker; and
   if two of the speech streams have a same highest moving average and if more than one of the speech streams recently contains speech. then marking the least-recently marked speech stream as the dominant speaker;
   indicating to a participant of the network-enabled conference that the marked speech stream is the dominant speaker effective to enable context associated with the dominant speaker to be provided to the participant.

12. The media of claim 11, wherein the act of indicating is performed about once every second.

13. The media of claim 11, further comprising, if two of the speech streams have a same highest moving average and if more than one of the speech streams most recently contains speech, then marking a least-recently marked speech stream, of the more than one speech streams that most recently contains speech, as the dominant speaker.

14. A method implemented at least in part by a computing device comprising:
   receiving audio streams from one or more participants in an Internet-enabled conference with three or more participants;
   determining which of the audio streams contain speech to provide one or more speech streams;
   maintaining a history of these speech streams;
   determining, at an interval of time and based on a period of the history of these speech streams and based on a moving average calculated using the history of these speech streams, that one of the participants is the dominant speaker; wherein the determining comprises:

if only one of the speech streams has the highest moving average, marking that speech stream as the dominant speaker;

if two of the speech streams have a same highest moving average and only one of the speech streams currently contains speech, marking the speech stream that currently contains speech as the dominant speaker; and if two of the speech streams have a same highest moving average and if more than one of the speech streams most recently contains speech, then marking the least-recently marked speech stream as the dominant speaker; and indicating, to at least one of the three or more participants, which of the participants is determined to be the dominant speaker.

15. The method of claim 14, further comprising assigning a weighting factor for at least one of the speech streams and wherein the act of determining that one of the participants is the dominant speaker is further based at least in part on this weighting factor.

16. The method of claim 14, further comprising adding a priority to at least one of the speech streams, the priority usable to determine that one participant is the dominant speaker when the history of the two or more audio streams are otherwise equivalent, and wherein the act of determining is based on this priority.

17. The method of claim 14, further comprising altering the interval based on the history of at least one of these speech streams and performing the method of claim 14 again using this altered interval.

18. The method of claim 14, further comprising altering the period based on prior history of at least one of the speech streams, the prior history being prior to that of the beginning of the period, and performing the method of claim 14 again, wherein the act of determining is based on this altered period.

19. The method of claim 14, further comprising altering the interval and period based on the speech stream of the participant determined to be the dominant speaker containing speech for greater than the period and performing the method of claim 14 again using this altered interval and based on this altered period.

20. The method of claim 14, further comprising altering the interval and period based on performance of the computing device and performing the method of claim 14 again using this altered interval and based on this altered period.

* * * * *

UNITED STATES PATENT AND TRADEMARK OFFICE
CERTIFICATE OF CORRECTION

| | | |
|---|---|---|
| PATENT NO. | : 7,664,246 B2 | Page 1 of 1 |
| APPLICATION NO. | : 11/275559 | |
| DATED | : February 16, 2010 | |
| INVENTOR(S) | : Anton W. Krantz et al. | |

It is certified that error appears in the above-identified patent and that said Letters Patent is hereby corrected as shown below:

In column 10, line 44, in Claim 11, delete "speech." and insert -- speech, --, therefor.

Signed and Sealed this
Eighth Day of February, 2011

David J. Kappos
*Director of the United States Patent and Trademark Office*